United States Patent
Shetty et al.

(10) Patent No.: US 12,067,416 B2
(45) Date of Patent: Aug. 20, 2024

(54) DYNAMICALLY REDISTRIBUTING I/O JOBS AMONG OPERATING SYSTEM THREADS

(71) Applicant: EMC IP Holding Company LLC, Hopkinton, MA (US)

(72) Inventors: Varsha Shetty, Bangalore (IN); Manickavasaham M. Senguden, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 256 days.

(21) Appl. No.: 17/382,416

(22) Filed: Jul. 22, 2021

(65) Prior Publication Data
US 2022/0391243 A1    Dec. 8, 2022

(30) Foreign Application Priority Data
Jun. 5, 2021    (IN) .............................. 202111025055

(51) Int. Cl.
*G06F 9/48*    (2006.01)
*G06F 9/50*    (2006.01)
(Continued)

(52) U.S. Cl.
CPC .............. *G06F 9/4843* (2013.01); *G06F 9/48* (2013.01); *G06F 9/4806* (2013.01); *G06F 9/485* (2013.01); *G06F 9/4856* (2013.01); *G06F 9/4881* (2013.01); *G06F 9/50* (2013.01); *G06F 9/5005* (2013.01); *G06F 9/5011* (2013.01);
(Continued)

(58) Field of Classification Search
CPC ........ G06F 9/48; G06F 9/4806; G06F 9/4843; G06F 9/485; G06F 9/4856; G06F 9/4881; G06F 9/50; G06F 9/5005; G06F 9/5011; G06F 9/5027; G06F 9/505; G06F 9/5061; G06F 9/5083; G06F 9/5088; G06F 11/30
See application file for complete search history.

(56) References Cited

U.S. PATENT DOCUMENTS

| 11,573,833 B2* | 2/2023 | Krasner ................ G06F 9/5027 |
| 2011/0276656 A1* | 11/2011 | Knapp .................... G06F 16/10 |
| | | 709/219 |

(Continued)

OTHER PUBLICATIONS

Song et al, "Paraio: A Scalable Network I/O Framework for Many-core Systems", 978-1-4799-7615-7/14, 2014 IEEE, pp. 1-6 (Year: 2014).*

*Primary Examiner* — Charles M Swift
(74) *Attorney, Agent, or Firm* — Muirhead and Saturnelli, LLC (57) ABSTRACT

A thread may be de-activated (terminated or hibernated) or activated (e.g., re-activated or create anew if allowed) on a processing node, in response to which it may be desirable to redistribute the I/O jobs among the now active threads. Redistributing the I/O jobs may involve re-associating one or more active threads resulting from the activation or de-activation with one or more of the bin groups and/or re-assigning one or more job bins with one or more bin groups, for example, as will now be described. The bin groups may be re-associated with remaining active threads. I/O jobs may be redistributed among the active threads re-assigning job bins to bin groups. One or more queued I/O jobs may be moved to the thread that now owns the I/O job.

20 Claims, 4 Drawing Sheets

(51) Int. Cl.
*G06F 11/30* (2006.01)
*G06F 13/16* (2006.01)

(52) U.S. Cl.
CPC ............ *G06F 9/5027* (2013.01); *G06F 9/505* (2013.01); *G06F 9/5061* (2013.01); *G06F 9/5083* (2013.01); *G06F 11/30* (2013.01); *G06F 13/1668* (2013.01)

(56) References Cited

U.S. PATENT DOCUMENTS

| | | | | |
|---|---|---|---|---|
| 2014/0115591 | A1* | 4/2014 | Chen | G06F 9/5027 |
| | | | | 718/102 |
| 2014/0380322 | A1* | 12/2014 | Ailamaki | G06F 9/5066 |
| | | | | 718/102 |
| 2019/0042305 | A1* | 2/2019 | McDonnell | G06F 9/5088 |
| 2023/0128059 | A1* | 4/2023 | Ma | G06F 3/0659 |
| | | | | 711/154 |

* cited by examiner

DYNAMICALLY REDISTRIBUTING I/O JOBS AMONG OPERATING SYSTEM THREADS

BACKGROUND

Technical Field

This application generally relates to data storage systems, and more particularly to dynamically redistributing input/output (I/O) jobs to operating system (OS) threads on a data storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (I/O) operations utilizing a physical storage device of the storage system, one or more components of the host system, storage system and network components therebetween may be used. The one or more combinations of components of the host, switching fabric and storage system over which I/O operations between an application and storage device may be communicated may be considered an I/O path between the application and the storage device. It should be appreciated that other combinations of components of a storage network, for example, two or more storage systems, also may be coupled together by one or more switches of a switching fabric. Thus, more generically, the one or more combinations of components of a first network component, switching fabric and second network component over which I/O communications may be communicated may be considered an I/O path between the two network components. The collective I/O paths between components of a storage network may be considered to define a connectivity of the storage network.

Host systems may not address the physical storage devices of a storage systems directly, but rather access to data may be provided to one or more host systems from what the host system(s) view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

SUMMARY OF THE INVENTION

In an embodiment of the invention, a method includes: creating a plurality of job bins for grouping I/O jobs on a processing node of a storage system; distributing the plurality of job bins among a plurality of bin groups of the processing node, including assigning a different subset of the plurality of job bins to each of the plurality of bin groups; associating each of the plurality of bin groups to a different active thread of a first quantity of threads of an operating system of the processing node, wherein each active thread executes I/O jobs of job bins assigned to the bin group associated with the active thread; in response to a change in a quantity of active threads from the first quantity of active threads to a second quantity of active threads of the processing node, re-associating one or more of the bin groups with at least one active thread of the second quantity of active threads; and moving one or more I/O jobs of one or more bins of the re-associated one or more bin groups to the at least one active thread for execution. Each active thread may have a thread identifier and each bin group may reference the thread identifier of the active thread associated with the bin group, and re-associating the one or more bin groups with the at least one active thread may include changing the thread identifier referenced by the one or more bin groups. The method may include: changing a quantity of the plurality of bin groups from the first quantity to the second quantity, including removing a first bin group of the plurality of bin groups; and redistributing the plurality of job bins among the second quantity of bin groups. A first of the plurality of active threads may become inactive resulting in the change to the second quantity of active threads such that the second quantity is less than the first quantity of active threads, where changing the quantity of the plurality of bin groups may include removing a bin group from the plurality of bin groups. The method further may include activating a thread resulting in the change to the second quantity of active threads such that the second quantity is greater than the first quantity of active threads, where changing the quantity of the plurality of bin groups may include adding a bin group to the plurality of bin groups. The plurality of job bins may be redistributed evenly among the second quantity of bin groups. The plurality of job bins may be distributed evenly among the plurality of bin groups, and moving the one or more I/O jobs may include moving an I/O job from a queue of pending I/O jobs for one of the first quantity of active threads other than the at least one active thread to a queue of pending I/O jobs for the at least one active thread.

In another embodiment of the invention, a system including executable logic that implements a method including: creating a plurality of job bins for grouping I/O jobs on a processing node of a storage system; distributing the plurality of job bins among a plurality of bin groups of the processing node, including assigning a different subset of the plurality of job bins to each of the plurality of bin groups; associating each of the plurality of bin groups to a different active thread of a first quantity of threads of an operating system of the processing node, wherein each active thread executes I/O jobs of job bins assigned to the bin group associated with the active thread; in response to a change in a quantity of active threads from the first quantity of active threads to a second quantity of active threads of the processing node, re-associating one or more of the bin groups with at least one active thread of the second quantity of active threads; and moving one or more I/O jobs of one or more bins of the re-associated one or more bin groups to the at least one active thread for execution. Each active thread may have a thread identifier and each bin group may reference the thread identifier of the active thread associated with the bin group, and re-associating the one or more bin groups with the at least one active thread may include changing the thread identifier referenced by the one or more bin groups. The method may include: changing a quantity of the plurality of bin groups from the first quantity to the second quantity, including removing a first bin group of the plurality of bin groups; and redistributing the plurality of job bins among the second quantity of bin groups. A first of the plurality of active threads may become inactive resulting in the change to the second quantity of active threads such that the second quantity is less than the first quantity of active threads, where changing the quantity of the plurality of bin groups may include removing a bin group from the plurality of bin groups. The method further may include activating a thread resulting in the change to the second quantity of active threads such that the second quantity is greater than the first quantity of active threads, where changing the quantity of the plurality of bin groups may include adding a bin group to the plurality of bin groups. The plurality of job bins may be redistributed evenly among the second quantity of bin groups. The plurality of job bins may be distributed evenly among the plurality of bin groups, and moving the one or more I/O jobs may include moving an I/O job from a queue of pending I/O jobs for one of the first quantity of active threads other than the at least one active thread to a queue of pending I/O jobs for the at least one active thread.

In another embodiment of the invention, a computer-readable media has software stored thereon, the software including: executable code that controls creating a plurality of job bins for grouping I/O jobs on a processing node of a storage system; executable code that controls distributing the plurality of job bins among a plurality of bin groups of the processing node, including assigning a different subset of the plurality of job bins to each of the plurality of bin groups; executable code that controls associating each of the plurality of bin groups to a different active thread of a first quantity of threads of an operating system of the processing node, wherein each active thread executes I/O jobs of job bins assigned to the bin group associated with the active thread; executable code that controls, in response to a change in a quantity of active threads from the first quantity of active threads to a second quantity of active threads of the processing node, re-associating one or more of the bin groups with at least one active thread of the second quantity of active threads; and executable code that controls moving one or more I/O jobs of one or more bins of the re-associated one or more bin groups to the at least one active thread for execution. Each active thread may have a thread identifier and each bin group may reference the thread identifier of the active thread associated with the bin group, and re-associating the one or more bin groups with the at least one active thread may include changing the thread identifier referenced by the one or more bin groups. The software further may include: executable code that controls changing a quantity of the plurality of bin groups from the first quantity to the second quantity, including removing a first bin group of the plurality of bin groups; and executable code that controls redistributing the plurality of job bins among the second quantity of bin groups. A first of the plurality of active threads may become inactive resulting in the change to the second quantity of active threads such that the second quantity is less than the first quantity of active threads, and changing the quantity of the plurality of bin groups may include removing a bin group from the plurality of bin groups. The software further may include: executable code that controls activating a thread resulting in the change to the second quantity of active threads such that the second quantity is greater than the first quantity of active threads, where changing the quantity of the plurality of bin groups may include adding a bin group to the plurality of bin groups. The plurality of job bins may be distributed evenly among the plurality of bin groups.

BRIEF DESCRIPTION OF THE DRAWINGS

Features and advantages of the present invention will become more apparent from the following detailed description of illustrative embodiments thereof taken in conjunction with the accompanying drawings in which.

EMBODIMENTS OF THE INVENTION

A director (e.g., a host adapter (HA)) of a storage system may implement a plurality of operating system (OS) threads that are primarily responsible for handling host I/O operations; i.e., executing I/O operations on the storage system that were initiated on a host system. Such OS threads may be referred to herein as "executor threads," "OS threads" or simply "threads." An I/O job of an OS of the storage system may be assigned to one or more related I/O operations (e.g., originating from a same I/O request on the host system). Each I/O job may be owned by a particular thread of the OS that executes the one or more I/O operations of the I/O job, and the state (e.g., including context) of each I/O job maintained by the executing thread.

It may be desirable to balance the I/O workload across multiple threads on the OS, or across multiple threads of an OS executing on a particular processing node (e.g., one or more CPUs or a CPU complex) of the storage system. To this end, upon initialization of the OS, e.g., during a powering up of a processing node, a predefined number of threads may be activated, and a plurality of job bins may be created, where a job bin is a logical abstraction for grouping I/O jobs. The I/O job bins then may be distributed among the active threads of the OS. It may be desirable to distribute the job bins evenly (e.g., as evenly as possible) among the active threads. For example, if there are 10 active threads and 100 bins, each active thread may be assigned 10 job bins. If there are 96 bins, a first 9 of the 10 threads may be assigned 10 bins and a last 1 of the 10 threads may be assigned 6 bins. To manage the assignment of bins to active threads, another software abstraction referred to herein as a "bin group" may be created, where each bin group corresponds to one specific active thread (i.e., there is a one-to-one correlation between active threads and bin groups), and each bin group may be assigned a group of job bins, for example, as part of an even distribution as described above.

Each bin group may be identified using a same identifier as the thread with which it is associated, and a sequential order of bin groups based on thread identifier may be maintained. For example, bin groups 1, 2, 3 and 4 (i.e., bin group IDs=1, 2, 3 and 4) may be associated with threads 1, 2, 3 and 4 (i.e., have threads IDs 1, 2, 3 and 4), and as noted above, each bin group may be assigned a group of job bins. When an I/O job is created, a thread from among a plurality of threads may be selected to execute the I/O job, e.g., based on the relative workloads (e.g., I/O counts) of the threads. Once a thread is selected, the I/O job may be designated to one of the bins of the bin groups associated with the thread.

On some storage systems, if a thread becomes inactive (e.g., goes into hibernation or otherwise "hangs"), processing by the thread ceases for the one or more I/O operations of an I/O job currently executing on the thread or pending for execution by the thread, and the one or more I/O operations may timeout on the originating host, causing the host to initiate another I/O request to perform the same one or more I/O operations of the lost I/O job. The delay caused by the timing out and reinitiating of I/O requests impacts performance of I/O operations initiating with the host.

When the host system initiates new I/O requests for the I/O jobs associated with the de-activated thread, I/O jobs owned by the remaining active threads (per the designations of I/O jobs to job bins, the assignment of job bins to bin groups, and the association of bin groups to active threads) may be assigned to the new I/O requests. Thus, if a de-activated (e.g., hibernating) thread is re-activated (e.g., comes out of hibernation), it does not continue to process the I/O operations it was processing before it became inactive. Rather, the re-activated thread may only be assigned to process new I/O operations that are created after it is re-activated, for example, by assigning the new I/O operations to I/O jobs designated to job bins assigned to bin groups associated with the re-activated thread.

When a thread is de-activated, it may be desirable to redistribute the thread's executing and pending I/O jobs to the remaining active threads, to avoid the timing out of I/O operations of such I/O jobs, and the delay and consumption of resources associated with such timing out and the initiating of new I/O requests by the host. One potential solution may be to redistribute the I/O jobs from job bins assigned to bin groups associated with the failed thread to job bins assigned to bin groups associated with the remaining active threads. However, some storage systems define a maximum number of I/O jobs that may be designated to a job bin, and such redistribution may not be permitted for one or more job bins if the addition of redistributed I/O jobs to such one or more job bins would exceed the predefined maximum number of I/O jobs allowed for such one or more job bins. Further, some storage systems do not allow the re-assignment of I/O jobs, where the assignment of I/O jobs to job bins is fixed when the OS is initiated and may not be changed without re-initiating the OS. Accordingly, the processing of the excess I/O jobs may hang, and the I/O processes thereof may timeout on the host system, requiring new I/O requests to be issued.

What may be desirable is a way to redistribute I/O jobs of a de-activated OS thread of a processing node among remaining active OS threads of the processing node that reduces or eliminates the timing out of I/O processes on the host and the associated impact on the host.

Described herein are methods and techniques for redistributing I/O jobs among active OS threads of a processing node, for example, on a storage system, in response to a change in number of active OS threads.

A thread may be de-activated (terminated or hibernated) or activated (e.g., re-activated or create anew if allowed) on a processing node, in response to which it may be desirable to redistribute the I/O jobs of the thread among the now active threads. Redistributing the I/O jobs may involve re-associating one or more active threads resulting from the activation or de-activation with one or more of the bin groups and/or re-assigning one or more job bins with one or more bin groups, for example, as will now be described.

In response to the thread being deactivated, a bin group may be de-activated or activated. For example, if a thread has been de-activated, a bin group may be de-activated to maintain a one-to-one relationship between active threads and bin groups. Alternatively, if a thread has been activated, a bin group may be activated to maintain the one-to-one relationship. De-activating a bin group may include disassociating whatever thread was associated with the bin group, and de-assigning any job bins assigned to the bin group. The thread may be disassociated and job bins de-assigned by updating an entry of a data structure, as described in more detail herein. Such entry also may include a flag indicating whether the bin group is active or inactive, and de-activating the bin group may include setting a value of the flag to indicate that the bin group is inactive. In some embodiments, de-activating a bin group may include deleting an entry in a data structure.

Activating a bin group may include creating a new bin group, which may include adding an entry representing the new bin group to a data structure. Alternatively, activating a bin group may include re-activating a previously de-activated bin group, which may include updating an entry in a data structure, for example, by setting a value of a flag to indicate that the bin group is now active.

The bin groups may be re-associated with remaining active threads, for example, to ensure that there is no gap between bin group identifiers of bin groups that are associated with active threads, and that there remains a one-to-one relationship between bin groups and active threads. It should be appreciated that if each bin group remained statically associated to a same thread, and bin group ID=thread ID, as opposed to being re-associated with an active thread, it may not be possible to dynamically redistribute I/O jobs (e.g., using job bins) using techniques described herein, and another more disruptive technique may need to be employed, which may result in performance degradation and unacceptable I/O response times. For example, perhaps all threads of a processing node would need to be terminated and restarted or new threads instantiated, and I/O jobs would need to be distributed among the restarted and/or new threads.

I/O jobs may be redistributed (e.g., in a balanced fashion) among the active threads by re-assigning job bins to bin groups. One or more queued I/O jobs may be moved to the thread (e.g., the queue of the thread) that now owns (i.e., is associated with) the I/O job. That is, for a given queued I/O job, if, as a result of the foregoing, the active thread associated with the bin group that owns the job bin (i.e., the job bin assigned to the bin group) to which the I/O job is designated has changed, the queued I/O job may be moved to the active thread.

Illustrative embodiments of the invention will now be described in more detail in relation to the figures.

Figure 1:
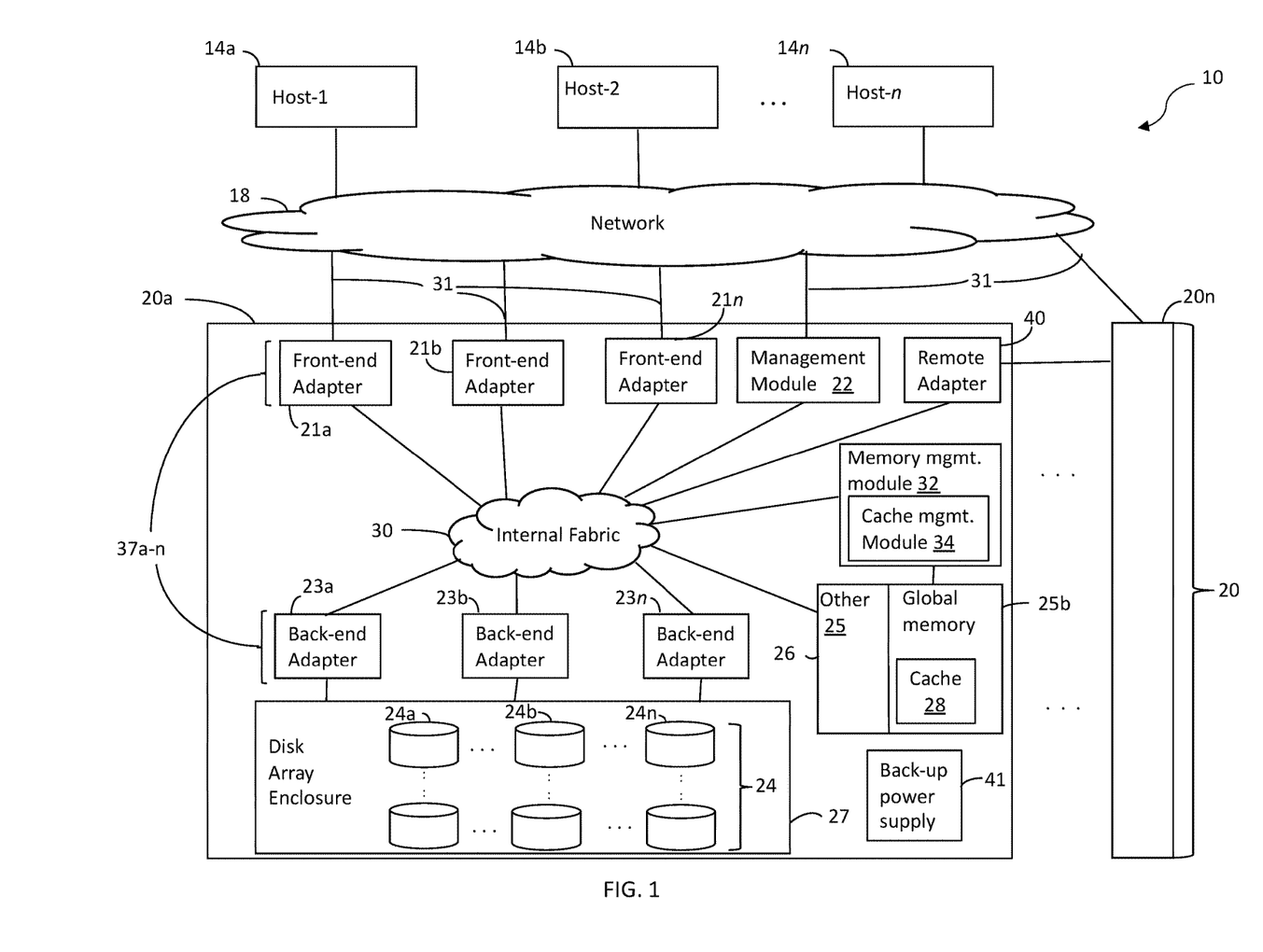
FIG. 1 is a block diagram illustrating an example of a data storage network, according to embodiments of the invention.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a switching fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more front-end adapters ("FAs") 21a-n (e.g., directors configured to serve as FAs), which also are referred to herein as host adapters ("HAs"). Each of these FAs may be used to manage communications and data operations between one or more host systems and global memory (GM) 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may be implemented (e.g., in hardware, firmware, software or a combination thereof) on a circuit board that includes memory resources (e.g., at least a segment of GM portion 25b) and compute resources, for example, one or more processing cores (e.g., as part of a CPU) and/or a CPU complex for processing I/O operations, and that as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (TB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

The memory 26 may include persistent memory for which for which data stored thereon persists after the process or program that created the data terminates. For example, at least portions of the memory 26 may be implemented using DIMM (or another type of fast RAM memory) that is battery-backed by a NAND-type memory (e.g., flash). In some embodiments, the data in such persistent memory may persist (for at least some period of time) after the storage system fails. The memory 26 (or at least a portion thereof—e.g., the cache 28 or a portion thereof) may be configured such that each data written to the memory 28 is mirrored to provide a form of write protection. For example, each memory location within each such mirrored portion of the memory 26 may have a corresponding memory location on the storage system 20a to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case mirroring may be configured such that a mirrored memory location and its corresponding redundant memory location are located on different physically discrete processing nodes.

Storage system 20a may include a back-up power supply 41 (e.g., a battery) that can provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20a (e.g., the memory 26 and/or memory management module 32) may be configured to automatically copy the contents of the memory 26 during this window of time to one or more predetermined physical storage devices, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a physical storage device. More broadly, vaulting may be performed for any data written to the memory 26.

The storage system 20a may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Figure 2:
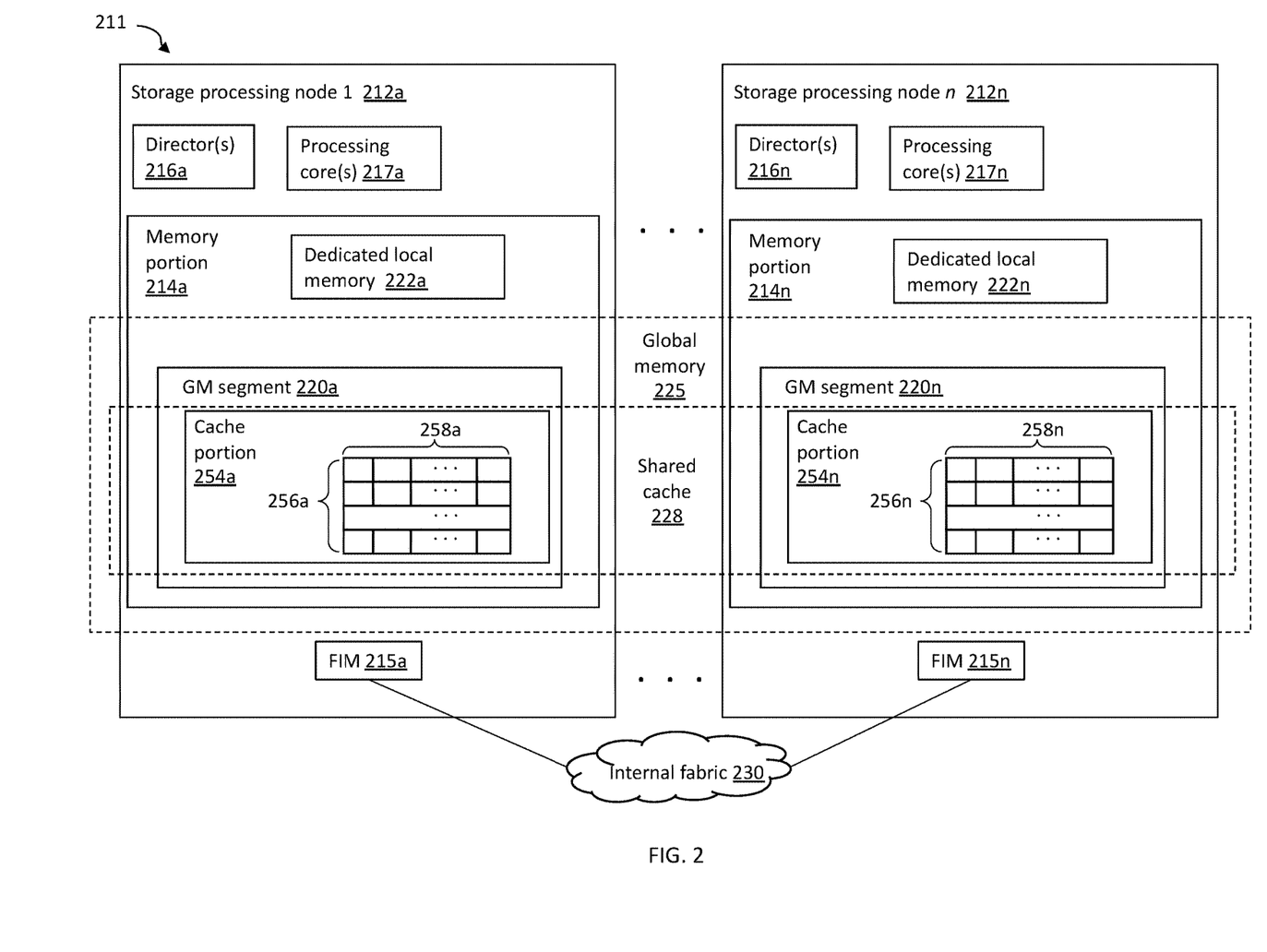
FIG. 2 is a block diagram illustrating an example of a storage system including multiple physically discrete storage processing nodes, according to embodiments of the invention.

Any of storage systems 20a-n, or one or more components thereof, described in relation to FIGS. 1-2 may be implemented using one or more Symmetrix™, VMAX™, VMAX3™ or PowerMax™ systems made available from Dell EMC.

Host systems 14a-n may provide data and control (e.g., management and access control) information to storage systems 20a-n over a plurality of I/O paths defined between the host systems and storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple, physically discrete storage processing nodes (e.g., circuit boards) 212a-212n, which may be referred to herein as "processing nodes." Storage system 211 may include a plurality of processing nodes 212a-212n and a fabric 230 (e.g., internal fabric 30) over which the processing nodes 212a-n may communicate. Each of the processing nodes 212a-212n may include components thereon as illustrated. The switching fabric 230 may include, for example, one or more switches and connections between the switch(es) and processing nodes 212a-212n. In at least one embodiment, the fabric 230 may be an IB fabric. In some embodiments, multiple processing 212a-n nodes may be implemented on a single physically discrete component; e.g., two processing nodes 212a-n may be implemented on single engine of PowerMax storage system.

In the following paragraphs, further details are described with reference to processing node 212a but each of the N processing nodes in a system may be similarly configured. For example, processing node 212a may include any of: one or more directors 216a (e.g., directors 37a-n); memory portion 214a; one or more processing cores 217a including compute resources, for example, as part of a CPUs and/or a CPU complex for processing I/O operations; and a fabric interface module (FIM) 215a for interfacing the processing node 212a to an internal fabric 230. Each director 216a may be configured to operate, such as by executing code, as any one or more of an FA, BE, RA, and the like. In some embodiments, each of the directors, or a portion thereof, are implemented in software stored in a memory portion 214a (e.g., in a dedicated local memory 222a) that is executed by one or more of the processing cores 217a. Such software implementation of directors may be considered emulations of types of physical directors (i.e., directors implemented (at least primarily) in hardware).

Each FIM 215a-n may include one or more host channel adapters (HCAs) that physically couple, and are configured to enable communication between, its respective processing node 212a-n, and the internal fabric 230. In some embodiments, the internal fabric 230 may include multiple (e.g., 2) switches, and each HCA 215a-n may have multiple (e.g., 2) ports, each one connected directly to one of the switches.

Each of the processing nodes 212a-n may, respectively, also include memory portions 214a-n. The memory portion of each processing node may be characterized as locally accessible with respect to that particular processing node, and more specifically with respect to other components on the same processing node. For example, processing node 212a includes memory portion 214a which is memory that is local to that particular processing node 212a. Data stored in memory portion 214a may be directly accessed by any of the processing cores 217a (e.g., executing instructions on behalf of one of the directors 216a) of the processing node 212a. For example, memory portion 214a may be a fast memory (e.g., DIMM (dual inline memory module) DRAM (dynamic random access memory)) that is locally accessible by a director 216a, where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of processing nodes 212a-n may be further partitioned into different portions or segments for different uses. For example, each of the memory portions 214a-214n may respectively include GM segments 220a-n configured for collective use as segments of a distributed GM, for example, GM 225 (e.g., GM 25b). Thus, data stored in any GM segment 220a-n may be accessed by any director 216a-n on any processing node 212a-n. Additionally, each of the memory portions 214a-n may respectively include dedicated local memories 222a-n. Each of the dedicated local memories 222a-n are respectively configured for use locally by the one or more directors 216a-n, and possibly other components, residing on the same single processing node. In at least one embodiment where there is a single director denoted by 216a (and generally by each of 216a-n), data stored in the dedicated local memory 222a may be accessed by the respective single director 216a located on the same processing node 212a.

However, the remaining directors located on other ones of the N processing nodes may not access data stored in the dedicated local memory 222a.

To further illustrate, GM segment 220a may include information such as user data stored in the cache portion 220a, metadata, and the like, that is accessed (e.g., for read and/or write) generally by any director of any of the processing nodes 212a-n. Thus, for example, any director 216a-n of any of the processing nodes 212a-n may communicate over the fabric 230 to access data in GM segment 220a. In a similar manner, any director 216a-n of any of the processing nodes 212a-n may generally communicate over fabric 230 to access any GM segment 220a-n of the distributed GM. Although a particular GM segment, such as 220a, may be locally accessible to directors on one particular processing node, such as 212a, any director of any of the processing nodes 212a-n may generally access the GM segment 220a. Additionally, the director 216a also may use the fabric 230 for data transfers to and/or from GM segment 220a even though 220a is locally accessible to director 216a (without having to use the fabric 230).

Also, to further illustrate, dedicated local memory 222a may be a segment of the memory portion 214a on processing node 212a configured for local use solely by components on the single/same processing node 212a. For example, dedicated local memory 222a may include data described in following paragraphs which is used and accessed only by directors 216a included on the same processing node 212a as the dedicated local memory 222a. In at least one embodiment in accordance with techniques herein and as described elsewhere herein, each of the dedicated local memories 222a-n may include a local page table or page directory used, respectively, by only director(s) 216a-n local to each of the processing nodes 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the cache portion 254a, various metadata and/or structures, and other information, as described in more detail elsewhere herein. Consistent with discussion herein, the cache portion 254a, having cache slots allocated from GM segments 220a-n, may be used to store I/O data (e.g., for servicing read and write operations).

Each cache portion 254a-n may be a portion of a shared cache 228 (e.g., cache 28) distributed across the processing nodes 212a-n, where the shared cache 228 may be considered a part of the GM 225. The cache portion 254a-n may include a plurality of cache slots 256a-n, each cache slot including one or more (e.g., 16) sections 258a-n. Each cache slot 256a-n may be of a uniform size (e.g., 128 KB) and each section may be of a uniform size (e.g., 8 KB). It should be appreciated that cache slot sizes and section sizes other than 128 KB and 8 KB, and a quantity of sections other than 16, may be used.

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

In some embodiments, multiple active OS threads may be executing on one of the storage nodes 212a-n, where multiple I/O jobs are currently assigned to each active thread, and are either currently being executed by the active thread or are pending execution by the active thread. It may be desirable to redistribute I/O jobs among active OS threads, for example, in response to a change in number of active OS threads.

Figure 3:
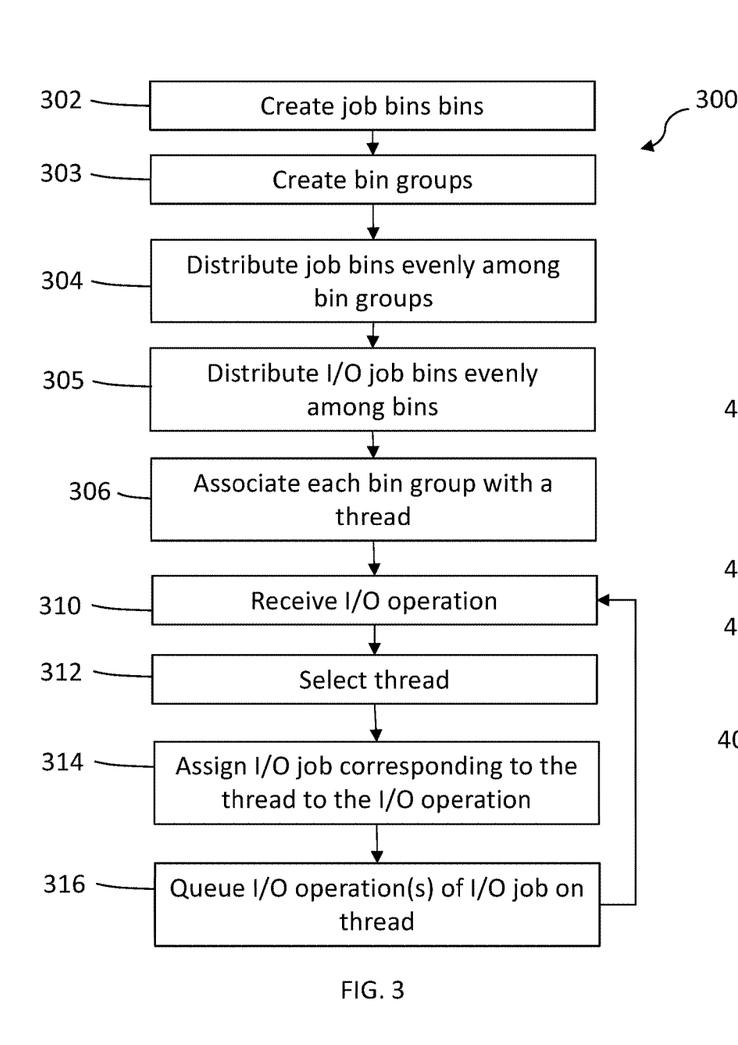
FIG. 3 is a flowchart illustrating a method of distributing I/O jobs among threads, according to embodiments of the invention.

FIG. 3 is a flowchart illustrating a method 300 of distributing I/O jobs among threads, according to embodiments of the invention. Other embodiments of a method of distributing I/O jobs among threads, for example, variations of the method 300, are possible and are intended to fall within the scope of the invention. The method 300 may be implemented on a storage system 20a, for example, by one or more directors 37a-n (e.g., one of FAs 21a-n) and/or by one or more of directors 216a-n of storage processing nodes 212a-n, respectively.

In a step 302, job bins may be created for a processing node, for example, to assist in grouping and managing I/O jobs on the processing node. It should be appreciated that, on some storage systems, there are not multiple separate discrete processing nodes, in which case the entire storage system may be considered a processing node. The number of job bins created may be based on any of a variety of factors, including, but not limited to: historical and/or forecasted I/O information, including, for example, number of storage groups, number of logical volumes, performance data, utilization data; connectivity between hot ports and storage system ports (e.g., zoning and/or masking); computational and memory resources available; storage capacity; number of hosts having access to the storage system (or processing node in particular); a desired level or granularity of management; other factors, or any suitable combination of the foregoing. In some embodiments, the number of job bins may remain fixed after being set.

In a step 303, bin groups may be created, where the number of bin groups created should be equal to the number of threads currently executing on the OS. Each bin group may have an identifier, where the collective identifiers may be a consecutively numbered sequence, for example, 0, 1, 2, 3, 4, 5, 6, . . . 24, 25, 26.

In a step 304, job bins may be distributed (e.g., evenly) among the bin groups, for example, as described in more detail elsewhere herein. That is, a different subset of the plurality of job bins may be assigned to each of the plurality of bin groups.

In a step 305, I/O jobs of the OS may be distributed (e.g., evenly) among the job bins, for example, as described in more detail elsewhere herein. That is, a different subset of the plurality of I/O jobs may be designated to each of the plurality of job bins.

In a step 306, each bin group may be associated with a specific thread of the processing node. For example, there may be a one-to-one correlation between bin groups and threads. To associate a bin group to a thread, the bin ID may initially be set equal to an ID of its associated thread. For example, if there are 27 threads having thread having thread IDs 0, 1, 2, 3, 4, 5, 6, . . . 24, 25, 26, then 27 bin groups may be created in the step 303 and, in the step 306 initially given the same IDs as their associated threads, IDs 0, 1, 2, 3, 4, 5, 6, . . . 24, 25, 26, respectively.

Figure 4:
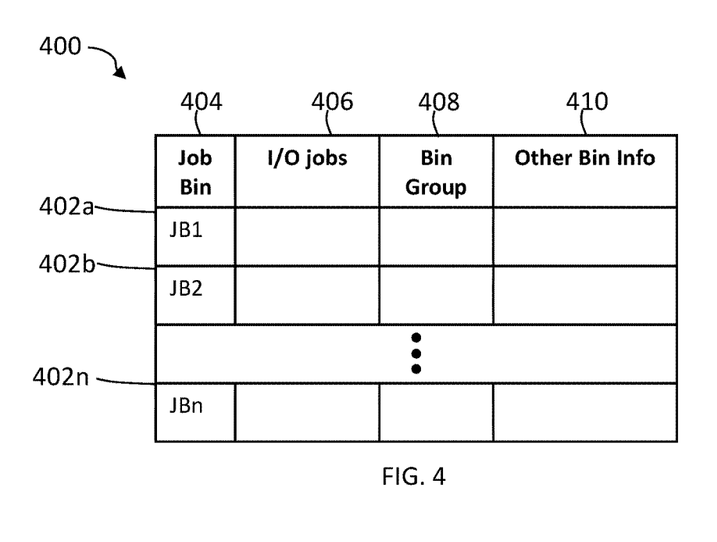
FIG. 4 is a block diagram illustrating a data structure for designating I/O jobs to job bins, according to embodiments of the invention.
Figure 5:
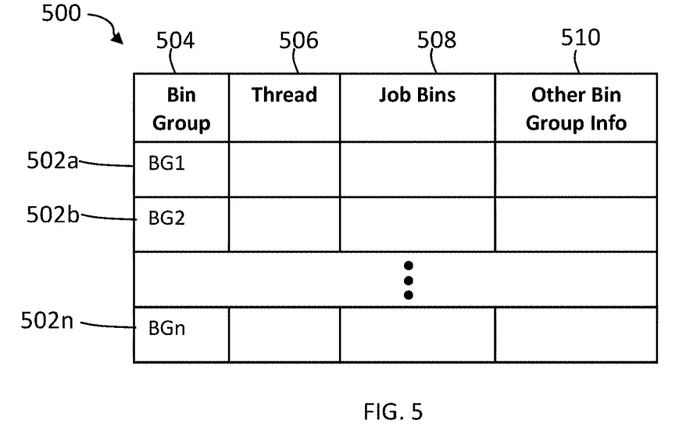
FIG. 5 is a block diagram illustrating a data structure for assigning job bins to bin groups, according to embodiments of the invention.
Figure 6:
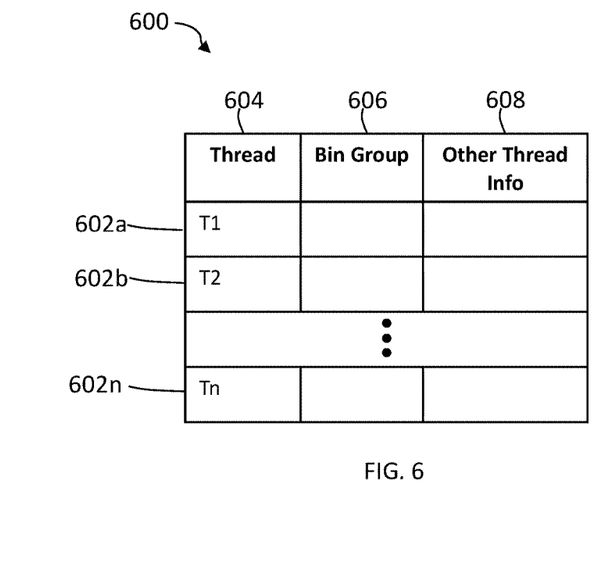
FIG. 6 is block diagrams illustrating a data structure for associating bin groups with threads, according to embodiments of the invention.

The performance of the steps 302-308 may result in the creation and/or updating of one or more data structures on the storage system, for example, data structures 400, 500 and 600 illustrated in FIGS. 4-6, respectively.

For purposes of illustration, consider a storage system having I/O jobs J0-J26 for threads T0-T2. The performance of the steps 302-303 may result in the creation of job bins B0-B8 and bin groups BG0-BG2. The performance of the step 304 may result in the bin group assignments reflected in the Table 1A; the performance of the step 305 may result in the job bin designations reflected in the Table 2A; and the performance of the step 306 may result in the thread associations reflected in the Table 3A. For purposes of illustration, a relatively low number of threads, bin groups, job bins and I/O jobs are described herein, including with respect to the tables used herein. It should be appreciated that: there may be more or less I/O jobs designated to each I/O bin, there may be more or less I/O bins assigned to each bin group, the number of I/O jobs designated to each job bin may be the same as, or different from, other job bins, and the number of job bins assigned to each bin group may be the same as, or different from, other bins groups.

TABLE 1A

Bin Group-Job Bin Assignments

| Bin Group | Job Bins |
|---|---|
| BG0 | B0-B2 |
| BG1 | B3-B5 |
| BG2 | B6-B8 |

TABLE 2A

Bin-Job Designations

| Job Bin | I/O Jobs |
|---|---|
| B0 | J0-J2 |
| B1 | J3-J5 |
| B2 | J6-J8 |
| B3 | J9-J11 |
| B4 | J12-J14 |
| B5 | J15-J17 |
| B6 | J18-J20 |
| B7 | J21-J23 |
| B8 | J24-J26 |

TABLE 3A

Thread-Bin Group Associations

| Thread | Bin Group |
|---|---|
| T0 | BG0 |
| T1 | BG1 |
| T2 | BG2 |

FIG. 4 is a block diagram illustrating the data structure 400 for designating I/O jobs to job bins, according to embodiments of the invention. Other embodiments of a data structure for designating I/O jobs to job bins, for example, variations of the data structure 400, are possible and are intended to fall within the scope of the invention. The data structure 400 may be referred to herein as the job bin table 400, and may be implemented as part of metadata for a processing node, for example, in global memory 25 and/or 225. It should be appreciated that the data structure 400 may be implemented using any of a variety of other suitable data structures, for example, an object-oriented data structure, linked-list, tree, other type of data structure or any suitable combination of the foregoing.

The job bin table 400 may include a plurality of entries (e.g., illustrated as rows) 402*a-n*, where each entry represents a job bin. Each entry may include any of: a job bin ID of the job bin represented by the entry in a job bin column 404; I/O job ID(s) of the one or more I/O jobs designated to the job bin in an I/O job column 406; a bin group ID of the bin group to which the job bin is assigned in a bin group column 408; and other information corresponding to the job bin represented by the entry in one or more other information columns 410. The information illustrated in the Table 2A may be reflected in the job bin table 400.

FIG. 5 is a block diagram illustrating a data structure 500 for assigning job bins to bin groups, according to embodiments of the invention. Other embodiments of a data structure for assigning job bins to bin groups, for example, variations of the data structure 500, are possible and are intended to fall within the scope of the invention. The data structure 500 may be referred to herein as the bin group table 500, and may be implemented as part of metadata for a processing node, for example, in global memory 25 and/or 225. It should be appreciated that the data structure 500 may be implemented using any of a variety of other suitable data structures, for example, an object-oriented data structure, linked-list, tree, other type of data structure or any suitable combination of the foregoing.

The bin group table 500 may include a plurality of entries (e.g., illustrated as rows) 502*a-n*, where each entry represents a bin group. Each entry may include any of: a bin group ID in a bin group column 504; a thread ID of the thread associated with the bin group in a thread column 506; the job bin ID(s) of the one or more job bins assigned to the bin group represented by the entry in a job bin column 508; and other information corresponding to the bin group represented by the entry in one or more other information columns 510. The information illustrated in the Table 1A may be reflected in the bin group table 500.

FIG. 6 is block diagram illustrating a data structure 600 for associating bin groups with threads, according to embodiments of the invention. Other embodiments of a data structure 600 for associating bin groups with threads, for example, variations of the data structure 600, are possible and are intended to fall within the scope of the invention. The data structure 600 may be referred to herein as the thread association table 600, and may be implemented as part of metadata for a processing node, for example, in global memory 25 and/or 225. It should be appreciated that the data structure 600 may be implemented using any of a variety of other suitable data structures, for example, an object-oriented data structure, linked-list, tree, other type of data structure or any suitable combination of the foregoing.

The thread association table 600 may include a plurality of entries (e.g., illustrated as rows) 602*a-n*, where each entry represents a thread-bin group association. Each entry may include any of: a thread ID of the thread represented by the entry in a thread column 604; a bin group ID of the bin group represented by the entry in a bin group column 606; and other information corresponding to the thread represented by the entry in one or more other information columns 608. The information illustrated in the Table 3A may be reflected in the thread association table 600.

Returning to the method 300, in a step 310, one or more related I/O operation may be received from a host system (e.g., one of the hosts 14*a-n*) at the processing node. In a step 312, a thread may be selected for the one or more I/O operations, e.g., based on the relative workloads (e.g., I/O counts per unit time) of the threads, e.g., for load balancing. The workload, e.g., I/O counts (per unit time) on each thread may be maintained in metadata for the processing node, for example, in global memory 25 and/or 225.

In a step 314, an I/O job corresponding to the selected thread may be assigned to the one or more I/O operations, for example, by assigning I/O job of a job corresponding to the selected thread, for example, a job bin assigned to a bin group associated with the thread. The I/O job assigned may be selected based on a load balancing amongst job bins, for example, a number total I/O counts (per unit time) for each job bin of the bin group associated with the thread. In a step 316, one or more I/O operations of the assigned I/O job may be queued for execution on the thread, or executed immediately if there are no other I/O jobs already queued for the thread.

With respect to the steps 312, 314 and 316, consider the example illustrated in Tables 1A, 2A and 3A for a new I/O operation. It may be determined that thread T1 has a lowest I/O load of threads T0-T2, and thread T1 may be selected for the new I/O operation. A currently unused I/O job J17 may be assigned to the new I/O operation, where I/O job J17 is designated to bin B5, and B5 is currently assigned to bin group B1, which is currently associated with thread T1. The I/O operation(s) corresponding to the I/O job J17 then may be queued for execution, or immediately executed, on thread T1.

In some embodiments, if a thread is activated or de-activated on a processing node, the I/O jobs on the processing node may be redistributed among the resulting active threads on the processing node.

Figure 7:
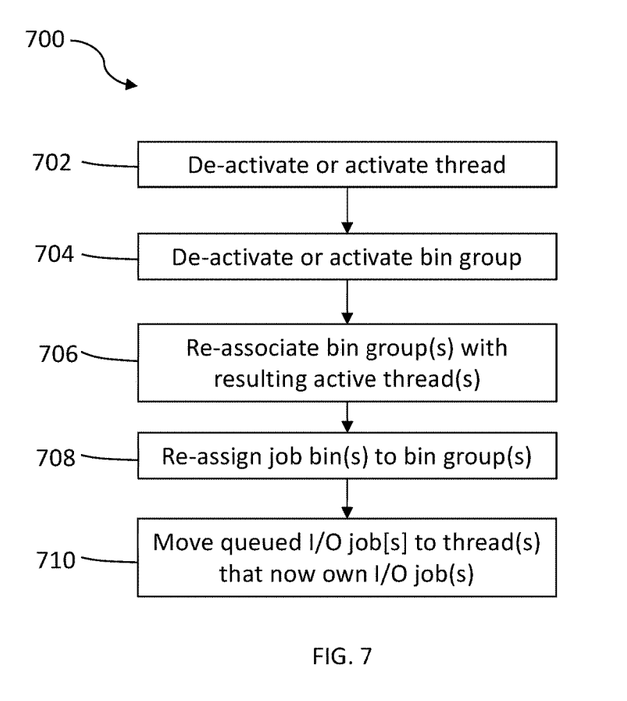
FIG. 7 is a flowchart illustrating a method of redistributing I/O jobs among threads in response to a change in the quantity of threads, according to embodiments of the invention.

FIG. 7 is a flowchart illustrating a method 700 of redistributing I/O jobs among threads in response to a change in the quantity of threads, according to embodiments of the invention. Other embodiments of a method of redistributing I/O jobs among threads in response to a change in the quantity of threads, for example, variations of the method 700, are possible and are intended to fall within the scope of the invention. The method 700 may be implemented on a storage system 20a, for example, by one or more directors 37a-n (e.g., one of FAs 21a-n) and/or by one or more of directors 216a-n of storage processing nodes 212a-n, respectively.

In a step 702, a thread may be de-activated (terminated or hibernated) or activated (e.g., re-activated or create anew if allowed) on a processing node, in response to which it may be desirable to redistribute the I/O jobs among the now active threads. It should be appreciated that some storage systems will not allow a new thread to be added (i.e., created anew) to a processing node unless the OS of the processing node is re-initiated. Redistributing the I/O jobs may involve re-associating one or more active threads resulting from the activation or de-activation with one or more of the bin groups and/or re-assigning one or more job bins with one or more bin groups, for example, as will now be described.

In a step 704, a bin group may be de-activated or activated. For example, if a thread is de-activated in the step 702, a bin group may be de-activated in the step 704 to maintain a one-to-one relationship between active threads and bin groups. If a thread is activated in the step 702, a bin group may be activated in the step 704 to maintain a one-to-one relationship between active threads and bin groups. De-activating a bin group may include disassociating whatever thread was associated with the bin group, and de-assigning any job bins assigned to the bin group. The thread may be disassociated and job bins de-assigned by updating an entry in the bin group table 500 representing the bin group. Such entry also may include a flag indicating whether the bin group is active or inactive, and de-activating the bin group may include setting a value of the flag to indicate that the bin group is inactive. In some embodiments, de-activating a bin group may include deleting an entry in the bin group table 500 representing the bin group.

Activating a bin group may include creating a new bin group, which may include adding an entry representing the new bin group to the bin group table 500. Alternatively, activating a bin group may include re-activating a previously de-activated bin group, which may include updating an entry in the bin group table 500, for example, by setting a value of a flag to indicate that the bin group is now active.

In a step 706, bin groups may be re-associated with remaining active threads, for example, to ensure that there is no gap between bin group identifiers of bin groups that are associated with active threads, and that there remains a one-to-one relationship between bin groups and active threads.

For the steps 704 and 706, consider again the example illustrated in Tables 1A, 2A and 3A. If thread T1 is de-activated, the bin group BG2 may be de-activated. The bin group BG1 may be re-associated with the active thread T2. That is, the active thread T2 may be re-associated with BG1 instead of BG2, which has been de-activated. Thus, while the original bin group identifiers (IDs) may have been set to the threads IDs that they were originally associated with, the bin group associations have changed as a result of the step 706, and thus the IDs of the bin groups may no longer match the IDs of the active threads with which they are associated, but there is no gap between the IDs of the current active bin groups.

It should be appreciated that if each bin group remained statically associated to a same thread, and bin group ID=thread ID, as opposed to being re-associated with an active thread, it may not be possible to dynamically redistribute I/O jobs (e.g., using job bins) using techniques described herein, and another more disruptive technique may need to be employed, which may result in performance degradation and unacceptable I/O response times. For example, perhaps all threads of a processing node would need to be terminated and restarted or new threads instantiated, and I/O jobs would need to be distributed among the restarted and/or new threads.

In a step 708, I/O jobs may be redistributed (e.g., in a balanced fashion) among the active threads by re-assigning job bins to bin groups. Consider again the example illustrated in Tables 1A, 2A and 3A. In response to the de-activation of the thread T1, the performance of the steps 704, 706 and 708 may result in the thread associations and bin group assignments illustrated in Tables 3B and 1B, respectively.

TABLE 1B

Bin Group-Job Bin Assignments

| Bin Group | Job Bins |
|---|---|
| BG0 | B0-B4 |
| BG1 | B5-B8 |

TABLE 3B

Thread-Bin Group Associations

| Thread | Bin Group |
|---|---|
| T0 | BG0 |
| T2 | BG1 |

In a step 710, one or more queued I/O jobs may be moved to the thread (e.g., the queue of the thread) that now owns (i.e., is associated with) the I/O job as result of performance of the steps 704-708. That is, for a given queued I/O job, if, as a result of the performance of the steps 704, 706 and 708, the active thread associated with the bin group that owns the job bin (i.e., the job bin assigned to the bin group) to which the I/O job is designated has changed, the queued I/O job may be moved to the active thread.

Consider another iteration of the steps 702-710 if the thread T1 is reactivated in the step 702. In a step 704, the bin group BG2 may be re-activated. In some embodiments, the step 706 reassociates bin groups with active threads according to bin group ID order and thread ID order, producing the original associations illustrated in Table 3A, and the step 708 re-assigns job bins to bin groups according to job bin ID order and bin group ID order, producing the original assignments illustrated in Table 1A. In other embodiments, the step 706 reassociates the bin group activated in the step 704 with the thread activated in the step 702, for example, resulting in T1 being associated with BG2, as opposed to BG1 as previously, as illustrated in Table 3C, and the step 706 re-assigns job bins to bin groups so that as few assignments are changed as possible, for example, as shown in Table 1C.

TABLE 1C

Bin Group-Job Bin Assignments

| Bin Group | Job Bins |
|---|---|
| BG0 | B0-B2 |
| BG1 | B5-B7 |
| BG2 | B3, B4, B8 |

TABLE 3C

Thread-Bin Group Associations

| Thread | Bin Group |
|---|---|
| T0 | BG0 |
| T1 | BG2 |
| T2 | BG1 |

In the step 710, any I/O jobs that are queued for execution by a thread and whose thread associations have changed as a result of the performance of the steps 704, 706 and 708 may be moved to the queues of the active threads to which they are now associated.

Throughout the performance of the method 700, host I/O operations may continue executing on active threads.

In some embodiments using the techniques and mechanisms described herein, one or more of the following benefits may be realized: threads of a processing node may be dynamically started and stopped in real time without impacting host I/O processes; the number of active threads may be dynamically increased or decreased by redistributing I/O jobs among active threads to accommodate the changing I/O load, resulting in a faster average I/O execution rate (e.g., more I/O operations per second); and/or hanging threads may be terminated and restarted dynamically without impacting host I/O operations.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 300 and 700, or parts thereof, may be implemented using one or more of the systems and/or data structures described in relation to FIGS. 1, 2 and 4-6 or components thereof. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, or any suitable combination thereof.

Software implementations of embodiments of the invention may include executable code that is stored on one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate operating system.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of an ordinal term, e.g., "first," "second" or the like, to qualify a term for an item having multiple instances of the same name does not necessarily indicate a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method comprising:
creating a plurality of job bins for grouping I/O jobs on a processing node of a storage system;
creating a first quantity of bin groups equal to a first quantity of active threads currently executing on the processing node;
distributing the plurality of job bins among the first quantity of bin groups of the processing node, including assigning a different subset of the plurality of job bins to each of the first quantity of bin groups;
associating each of the first quantity of bin groups with a single different active thread of the first quantity of active threads of an operating system of the processing node, wherein each active thread of the first quantity is associated with a single one of the first quantity of bin groups and executes I/O jobs of job bins assigned to the single bin group associated with said each active thread;

in response to a change in a current number of active threads from the first quantity of active threads to a second quantity of active threads of the processing node, performing first processing including:

changing a current number of bin groups from the first quantity to the second quantity so as to retain a one-to-one relationship between bin groups and active threads where the current number of bin groups equals the current number of active threads; and redistributing I/O jobs among the second quantity of active threads of the processing node, wherein said redistributing I/O jobs includes:

re-associating one or more of the second quantity of bin groups with one or more active threads of the second quantity of active threads, wherein each of the second quantity of active threads is associated with a single one of the second quantity of bin groups and executes I/O jobs of job bins assigned to the single bin group associated with said each active thread, and wherein each of the second quantity of bin groups is associated with a single different active thread of the second quantity of active threads;

reassigning one or more of the plurality of jobs bins to at least one of the second quantity of bin groups; and redistributing the plurality of job bins among the second quantity of bin groups; and moving one or more I/O jobs of one or more job bins of the re-associated one or more bin groups to the one or more active threads of the second quantity for execution.

2. The method of claim 1, wherein each active thread has a thread identifier and each bin group references the thread identifier of the active thread associated with said each bin group, and wherein said re-associating the one or more of the second quantity of bin groups includes changing one or more thread identifiers referenced by the one or more bin groups.

3. The method of claim 1, wherein said changing the current number of bin groups includes:

removing a first bin group from the first quantity of bin groups.

4. The method of claim 1, wherein a first of the first quantity of active threads becomes inactive resulting in the change of the current number of active threads to the second quantity of active threads such that the second quantity is less than the first quantity of active threads, and wherein said changing the current number of bin groups includes removing a bin group from the first quantity of bin groups.

5. The method of claim 3, further comprising:

activating a thread resulting in the change to the current number of active threads to the second quantity of active threads such that the second quantity is greater than the first quantity of active threads;

wherein changing the current number of bin groups to the second quantity includes adding a bin group to the current number of bin groups.

6. The method of claim 3, wherein the plurality of job bins is redistributed evenly among the second quantity of bin groups.

7. The method of claim 1, wherein said distributing includes evenly distributing the plurality of job bins among the first quantity of bin groups.

8. The method of claim 1, wherein said moving the one or more I/O jobs includes moving an I/O job from a queue of pending I/O jobs for one of the first quantity of active threads other than the one or more active threads to a queue of pending I/O jobs for a particular one of the one or more active threads.

9. A system comprising:

one or more processors; and a memory comprising code stored thereon that, when executed, performs a method comprising:

creating a plurality of job bins for grouping I/O jobs on a processing node of a storage system;

creating a first quantity of bin groups equal to a first quantity of active threads currently executing on the processing node;

distributing the plurality of job bins among the first quantity of bin groups of the processing node, including assigning a different subset of the plurality of job bins to each of the first quantity of bin groups;

associating each of the first quantity of bin groups with a single different active thread of the first quantity of active threads of an operating system of the processing node, wherein each active thread of the first quantity is associated with a single one of the first quantity of bin groups and executes I/O jobs of job bins assigned to the single bin group associated with said each active thread;

in response to a change in a current number of active threads from the first quantity of active threads to a second quantity of active threads of the processing node, performing first processing including:

changing a current number of bin groups from the first quantity to the second quantity so as to retain a one-to-one relationship between bin groups and active threads where the current number of bin groups equals the current number of active threads; and redistributing I/O jobs among the second quantity of active threads of the processing node, wherein said redistributing I/O jobs includes:

re-associating one or more of the second quantity of bin groups with one or more active threads of the second quantity of active threads, wherein each of the second quantity of active threads is associated with a single one of the second quantity of bin groups and executes I/O jobs of job bins assigned to the single bin group associated with said each active thread, and wherein each of the second quantity of bin groups is associated with a single different active thread of the second quantity of active threads;

reassigning one or more of the plurality of jobs bins to at least one of the second quantity of bin groups; and redistributing the plurality of job bins among the second quantity of bin groups; and moving one or more I/O jobs of one or more job bins of the re-associated one or more bin groups to the one or more active threads of the second quantity for execution.

10. The system of claim 9, wherein each active thread has a thread identifier and each bin group references the thread identifier of the active thread associated with said each bin group, and wherein said re-associating the one or more of the second quantity of bin groups includes changing one or more thread identifiers referenced by the one or more bin groups.

11. The system of claim 9, wherein said changing the current number of bin groups includes:
removing a first bin group from the first quantity of bin groups.

12. The system of claim 9, wherein a first of the first quantity of active threads becomes inactive resulting in the change of the current number of active threads to the second quantity of active threads such that the second quantity is less than the first quantity of active threads, and
wherein said changing the current number of bin groups includes removing a bin group from the first quantity of bin groups.

13. The system of claim 11, wherein the method further includes:
activating a thread resulting in the change to the current number of active threads to the second quantity of active threads such that the second quantity is greater than the first quantity of active threads,
wherein changing the current number of bin groups to the second quantity includes adding a bin group to the current number of bin groups.

14. The system of claim 9, wherein the plurality of job bins is distributed evenly among the plurality of bin groups.

15. One or more non-transitory computer-readable media having code stored thereon that, when executed, performs a method comprising:
creating a plurality of job bins for grouping I/O jobs on a processing node of a storage system;
creating a first quantity of bin groups equal to a first quantity of active threads currently executing on the processing node;
distributing the plurality of job bins among the first quantity of bin groups of the processing node, including assigning a different subset of the plurality of job bins to each of the first quantity of bin groups;
associating each of the first quantity of bin groups with a single different active thread of the first quantity of active threads of an operating system of the processing node, wherein each active thread of the first quantity is associated with a single one of the first quantity of bin groups and executes I/O jobs of job bins assigned to the single bin group associated with said each active thread;
in response to a change in a current number of active threads from the first quantity of active threads to a second quantity of active threads of the processing node, performing first processing including:
changing a current number of bin groups from the first quantity to the second quantity so as to retain a one-to-one relationship between bin groups and active threads where the current number of bin groups equals the current number of active threads; and redistributing I/O jobs among the second quantity of active threads of the processing node, wherein said redistributing I/O jobs includes:
re-associating one or more of the second quantity of bin groups with one or more active threads of the second quantity of active threads, wherein each of the second quantity of active threads is associated with a single one of the second quantity of bin groups and executes I/O jobs of job bins assigned to the single bin group associated with said each active thread, and wherein each of the second quantity of bin groups is associated with a single different active thread of the second quantity of active threads;
reassigning one or more of the plurality of jobs bins to at least one of the second quantity of bin groups; and
redistributing the plurality of job bins among the second quantity of bin groups; and
moving one or more I/O jobs of one or more job bins of the re-associated one or more bin groups to the one or more active threads of the second quantity for execution.

16. The one or more non-transitory computer-readable media of claim 15, wherein each active thread has a thread identifier and each bin group references the thread identifier of the active thread associated with said each bin group, and
wherein said re-associating the one or more of the second quantity of bin groups includes changing one or more thread identifiers referenced by the one or more bin groups.

17. The one or more non-transitory computer-readable media of claim 15, wherein said changing the current number of bin groups includes:
removing a first bin group from the first quantity of bin groups.

18. The one or more non-transitory computer-readable media of claim 15, wherein a first of the first quantity of active threads becomes inactive resulting in the change of the current number of active threads to the second quantity of active threads such that the second quantity is less than the first quantity of active threads, and
wherein said changing the current number of bin groups includes removing a bin group from the first quantity of bin groups.

19. The one or more non-transitory computer-readable media of claim 17, further comprising:
activating a thread resulting in the change to the current number of active threads to the second quantity of active threads such that the second quantity is greater than the first quantity of active threads;
wherein changing the current number of bin groups to the second quantity includes adding a bin group to the current number of bin groups.

20. The one or more non-transitory computer-readable media of claim 15, wherein said distributing includes evenly distributing the plurality of job bins among the first quantity of bin groups.

* * * * *